(No Model.)

B. F. APPLEGATE.
CLUTCH COUPLING.

No. 344,611. Patented June 29, 1886.

WITNESSES:

INVENTOR:
B. F. Applegate
BY Munn & Co.
ATTORNEYS.

UNITED STATES PATENT OFFICE.

BENJAMIN F. APPLEGATE, OF NEW ALBANY, INDIANA.

CLUTCH-COUPLING.

SPECIFICATION forming part of Letters Patent No. 344,611, dated June 29, 1886.

Application filed November 9, 1885. Serial No. 182,208. (No model.)

*To all whom it may concern:*

Be it known that I, BENJAMIN F. APPLEGATE, of New Albany, in the county of Floyd and State of Indiana, have invented a new and Improved Clutch-Coupling, of which the following is a full, clear, and exact description.

My invention relates to clutch-couplings, more particularly of that class used to couple driving shafts and pulleys for united motion, and uncoupling them for starting and stopping machinery of various kinds.

The invention has for its object to provide a clutch of simple inexpensive construction which will drive both ways without backlash, and will automatically take up the wear of the driving-shoulders, and will couple or uncouple readily.

The invention consists in certain novel features of construction and combinations of parts of the clutch-coupling, all as hereinafter fully described and claimed.

Reference is to be had to the accompanying drawings, forming part of this specification, in which similar letters of reference indicate corresponding parts in all the figures.

Figure 1:
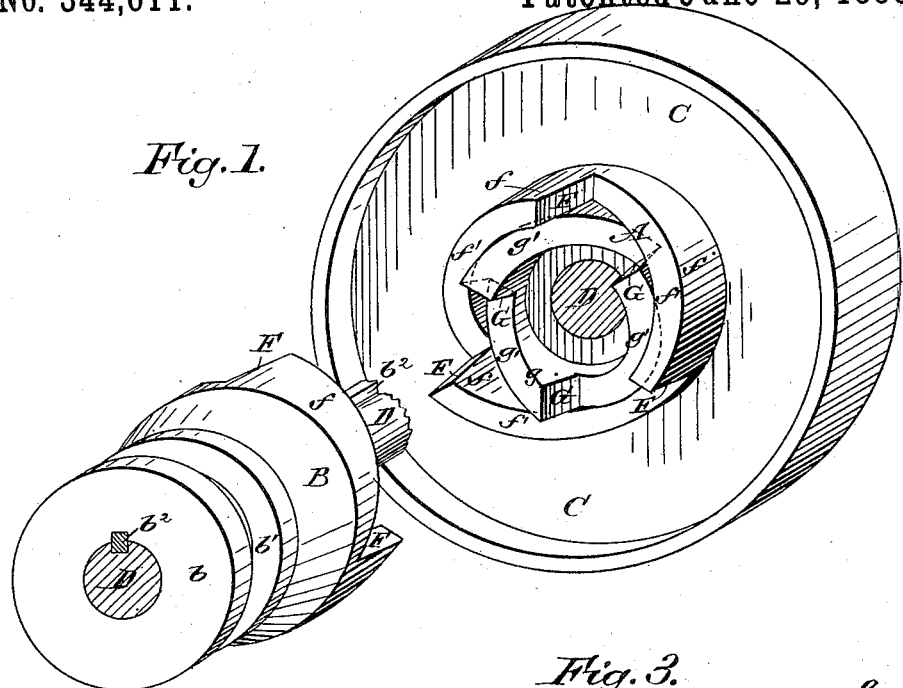
Figure 2:
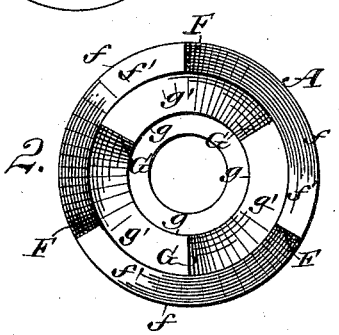
Figure 3:
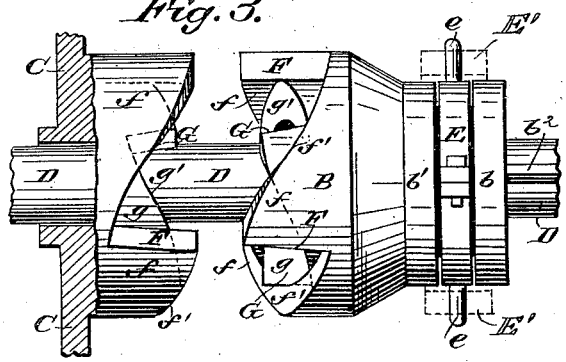

Figure 1 is a perspective view illustrating the application of my improved clutch-coupling to a shaft and a loose pulley placed thereon, the shaft being broken away the better to show the construction. Fig. 2 is a face view of one half or section of the clutch-coupling. Fig. 3 is a view of the clutch-coupling and shaft in side elevation, and with part of the loose pulley in section.

The clutch-coupling is made with two half clutches or sections, A B, which are counterparts of each other, and are adapted to interlock, as presently explained.

I show the half-clutch A made fast to a pulley, C, which is loose on a driving-shaft, D, and I show the half-clutch B provided with a callar, $b$, grooved at $b'$, to receive the split collar E, which has opposite pins $e\ e$, which are adapted to be engaged by the shipper E', the ends of which are shown in dotted lines in Fig. 3, for sliding the half-clutch B along the shaft D, to which it is splined or keyed at $b^2$, so it may engage the half-clutch A, to give motion to the pulley C from the shaft, and be disengaged from half-clutch A to allow the pulley C to stop.

Each of the half-clutches A B is formed at its acting face with two annular series of driving shoulders or faces, as at F G, produced by cutting away the face of the clutch at an incline backward from the extreme ends of the shoulders F G, as at $f'\ g'$, whereby a double series of clutch-teeth, $f\ g$, are formed on each half-clutch A B. I show three teeth, $f$, and three teeth, $g$, on each half clutch, which teeth have the driving shoulders or faces F G, respectively, and the teeth are so formed that the extreme points of the outer teeth, $f$, stand half-way between the extreme points of the inner teeth, $g$, or so that the teeth of the opposite half-clutches lap on each other at their sides when the half-clutches are engaged with each other, and consequently prevent all lateral or side motion or jar of the two parts of the clutch one on the other, and insure a lateral steadiness of the shaft and driving pulleys or gearing therewith connected.

I make the teeth $f\ g$ with their driving faces or shoulders F G, respectively, facing opposite directions of rotation of the engaged clutch-coupling, so that the shoulders F of the half-clutches may drive the connected pulley or gear in one direction, and the shoulders G may drive the pulley or gear in the opposite direction, and so that whichever direction of rotation the engaged clutch-coupling may have, one of the two series of shoulders F or G will do the driving and the other series of shoulders will effectually prevent all backlash in the coupled clutch, so that all unsteadiness or shock in the rotation of the clutch-coupling will be avoided; hence the coupling is well adapted for use in driving shafts or machinery requiring quick or slow reversals of movement, which may be made by using my coupling, and without causing shock, jar, or noise in the coupling.

To more effectually and positively lock the half-clutches A B to each other for avoiding backlash, and shock, jar, or noise in the coupling, and also to insure a close fit of the driving shoulders or faces F G on each other by providing for automatically taking up the wear of said shoulders F G as fast as it occurs, I make said shoulders F or G, or both series of them, on a backward incline or bevel from the bases to the points of the clutch-teeth $f$ or $g$, as clearly shown in the drawings, and so that when the clutch-coupling is first put to use, the shoulders F G of the opposite half-clutches will lock firmly against each other, while the inclined faces $f'$ $g'$ of the clutch-teeth $f$ $g$ are separated somewhat—say for about one-fifth of the interlocking depth of the opposite half-clutches; hence as the shoulders F G wear they will move inward farther, so that the half-clutches will interlock more deeply, as will readily be understood.

I make one of the two annular series of clutch-teeth on the opposite half-clutches A B—preferably the outer series of teeth, $f$—longer than the other series of teeth, so that as the half-clutch B is slid up to engage the half-clutch A, the extremities of the opposite higher teeth first will engage each other, and will guide the other or shorter opposite clutch-teeth into easy quiet engagement as the two clutch-sections are being fully interlocked to effect the coupling.

There may be as many teeth $f$ or $g$ in annular series on each half-clutch as the size of the clutch-coupling, or the position or circumstances attending the use of the coupling may require.

Having thus described my invention, what I claim as new, and desire to secure by Letters Patent, is—

1. A clutch-coupling comprising fast and loose half-clutches, each formed at its interlocking face with two annular series of teeth, as at $f$ $g$, having inclined faces, as at $f'$ $g'$, and driving-shoulders which face reverse ways, to allow the interlocked half-clutches to drive in reverse directions and without backlash, and said teeth $f$ $g$ being side lapped on each other, to prevent lateral movement of the clutch-sections, and the connected shafts or gearing, as set forth.

2. A clutch-coupling comprising fast and loose half-clutches formed at their interlocking faces with teeth, as at $f$, having inclined faces, as at $f'$, and driving-shoulders, as at F, which are beveled or inclined backward from their roots to their points, substantially as shown and described, whereby the said shoulders F will adjust themselves automatically to take up wear, as set forth.

3. A clutch-coupling comprising fast and loose half-clutches, each formed at its interlocking face with two annular series of teeth having one inclined face, and a driving-shoulder beveled or inclined backward from the root to the point of the tooth, for taking up wear of the driving-shoulders, and the driving-shoulders of the two series of teeth being arranged to face reverse ways, for driving the clutch-connected shafts or gearing in opposite directions and without backlash, substantially as herein set forth.

4. A clutch-coupling comprising fast and loose half-clutches, each formed at its interlocking face with two annular series of teeth, having one inclined face and a driving-shoulder beveled or inclined backward from the root to the point of the tooth, for taking up wear of the driving-shoulders, and the driving-shoulders of the two series of teeth being arranged to face reverse ways, for driving the clutch-connected shafts or gearing in opposite directions without backlash, and the two series of clutch-teeth being side lapped on each other, to prevent lateral movement of the engaged clutch-sections and the connected shafts or gearing, substantially as shown and described.

BENJAMIN F. APPLEGATE.

Witnesses:
JOHN H. STOHENBURG,
HARRY A. BUERK.